(12) United States Patent
Heinzen et al.

(10) Patent No.: US 10,357,050 B2
(45) Date of Patent: Jul. 23, 2019

(54) SYSTEM AND METHOD FOR BOTTOM COATING FOOD PRODUCTS

(71) Applicant: General Mills, Inc., Minneapolis, MN (US)

(72) Inventors: Thomas E Heinzen, Burnsville, MN (US); Zachary Harder, Crystal, MN (US)

(73) Assignee: General Mills, Inc., Minneapolis, MN (US)

( * ) Notice: Subject to any disclaimer, the term of this patent is extended or adjusted under 35 U.S.C. 154(b) by 28 days.

(21) Appl. No.: 15/800,880

(22) Filed: Nov. 1, 2017

(65) Prior Publication Data

US 2018/0049452 A1 Feb. 22, 2018

Related U.S. Application Data

(60) Division of application No. 14/894,677, filed as application No. PCT/US2014/050100 on Aug. 7, (Continued)

(51) Int. Cl.
*A23L 5/30* (2016.01)
*A23P 20/17* (2016.01)
(Continued)

(52) U.S. Cl.
CPC ............... *A23L 5/30* (2016.08); *A23G 1/54* (2013.01); *A23G 3/0093* (2013.01); *A23L 7/126* (2016.08);
(Continued)

(58) Field of Classification Search
CPC ........ A23L 1/0061; A23L 7/126; A23P 20/17; A23P 20/11; A23P 20/18; A23G 1/54;
(Continued)

(56) References Cited

U.S. PATENT DOCUMENTS 1,309,106 A * 7/1919 Savy .................. A23G 3/20
118/18
1,341,023 A 5/1920 Savy
(Continued)

FOREIGN PATENT DOCUMENTS

EP 1498037 1/2005
FR 484842 11/1917
(Continued)

*Primary Examiner* — Dana Ross
*Assistant Examiner* — Joseph M Baillargeon
(74) *Attorney, Agent, or Firm* — Diederiks & Whitelaw, PLC; Gregory P. Kaihoi, Esq.

(57) ABSTRACT

A product conveying and coating system includes at least first and second, sequentially arranged conveyor belts, with at least the second conveyor belt being a solid belt. Interposed in a gap between the first and second belts is a dispenser head of a coating manifold. The dispenser head spans the gap between upper surface portions of the first and second conveyor belts, with an elongated side wall outlet portion of the dispenser head being exposed, in a downstream direction of the overall conveyor unit, to the upper surface of the second conveyor belt. The system provides for dispensing of coating material directly onto the second, solid conveyor belt and enrobing at least bottom and partial side portions of food products upon the solid belt. Provisions are made for scraping from the solid belt, removing from the coated food products and recycling excess coating material.

19 Claims, 5 Drawing Sheets

Related U.S. Application Data 2014, now Pat. No. 9,826,762, which is a continuation-in-part of application No. 13/963,143, filed on Aug. 9, 2013, now Pat. No. 9,635,873.

(51) Int. Cl.
| | | |
|---|---|---|
| *A23L 7/126* | (2016.01) | |
| *A23P 20/10* | (2016.01) | |
| *A23P 20/18* | (2016.01) | |
| *A23G 1/54* | (2006.01) | |
| *A23G 3/34* | (2006.01) | |

(52) U.S. Cl.
CPC .............. *A23P 20/11* (2016.08); *A23P 20/17* (2016.08); *A23P 20/18* (2016.08)

(58) Field of Classification Search
CPC .......... A23G 3/0093; A23G 3/22; A23G 3/20; A23G 3/0252; A23G 3/24; A23G 1/205; A23G 3/0036; A23G 3/0038; A23G 3/0278; A23G 3/0284; A23G 3/06; A23G 3/10; A23G 3/2007; A23G 3/2076; A23G 3/54; A23G 7/0093; A23G 7/02; A23G 9/245
USPC .. 99/450.1, 386, 443 C, 349, 391, 516, 494; 198/341.09, 792; 118/16, 24, 30, 324, 118/13, 26; 426/302; 427/355, 359
See application file for complete search history.

(56) References Cited

U.S. PATENT DOCUMENTS

| | | | |
|---|---|---|---|
| 1,417,086 | A | 5/1922 | Massarella |
| 1,524,230 | A | 1/1925 | Linton |
| 1,775,475 | A * | 9/1930 | Savy ................. A23G 3/22 101/147 |
| 1,843,859 | A | 2/1932 | Baker et al. |
| 3,220,379 | A | 11/1965 | Wallis |
| 3,536,034 | A | 10/1970 | Lecrone |
| 4,058,083 | A | 11/1977 | Miller |
| 4,587,128 | A | 5/1986 | Cummings |
| 4,877,629 | A | 10/1989 | Stypula et al. |
| 4,961,940 | A | 10/1990 | Hansson |
| 5,643,361 | A | 7/1997 | Wadell |
| 6,242,022 | B1 | 6/2001 | Bertrand et al. |
| 7,556,493 | B2 | 7/2009 | Suttle et al. |
| 7,694,625 | B2 * | 4/2010 | Baumer ............ A23G 1/205 99/386 |
| 8,056,470 | B2 | 11/2011 | Blasing |
| 8,846,124 | B2 | 9/2014 | Heinzen |
| 2006/0286220 | A1 | 12/2006 | King |
| 2007/0172542 | A1 | 7/2007 | Krogsgaard |
| 2009/0123620 | A1 | 5/2009 | Hiti et al. |

FOREIGN PATENT DOCUMENTS

| | | | |
|---|---|---|---|
| GB | 2193073 | A1 * | 2/1988 |
| WO | 9515699 | | 6/1995 |
| WO | WO9515699 | * | 6/1995 |
| WO | 3079803 | | 10/2003 |

* cited by examiner

SYSTEM AND METHOD FOR BOTTOM COATING FOOD PRODUCTS

CROSS-REFERENCE TO RELATED APPLICATIONS

This application represents a divisional application of U.S. patent application Ser. No. 14/894,677, pending, filed Nov. 30, 2015 entitled "System and Method for Bottom Coating Food Products" which claims benefit of International Application No. PCT/US2014/050100 filed Aug. 7, 2014, which represents a continuation-in-part of U.S. patent application Ser. No. 13/963,143 filed Aug. 9, 2013 entitled "System and Method for Bottom Coating Food Products", now U.S. Pat. No. 9,635,873, all of which are hereby incorporated by reference in their entirety.

FIELD OF THE INVENTION

The invention pertains to the art of coating food products and, more specifically, to a system and method of coating bottom portions of food products conveyed upon a solid belt.

BACKGROUND OF THE INVENTION

In the manufacturing of certain food products, it is sometimes desired to provide a surface coating on the food products. For instance, topical coatings are quite common on a wide range of food products. The overall coating process can significantly vary, particularly depending on the coating material being employed and the food product surfaces to be coated. For instance, in the case of topical coatings, whether in particulate or liquid form, it is common to provide a feed hopper or other dispenser above the food product as the product moves along a conveyor. In such an arrangement, the conveyor belt is generally formed of interconnected metal wires or links which enables most of the excess coating material to fall or flow through the conveyor belt and collected for reuse. If it is desired to coat the bottom and even sides of a food product, the conveyor belt can be directed into a container of the coating material, essentially dipping the food product and mesh conveyor belt in the coating material. In the art, this type of coating system which enables coating of multiple surfaces of a food product is often referred to as an enrober.

Known enrobers are considered to be quite expensive and complicated. In addition, in the food industry, the conveyors must be cleaned at regular intervals, which can be important for various reasons including allergens. At least in the case of liquid coating enrobers, cleaning the links of the conveyor is extremely difficult and time consuming. By way of example, in the range of twenty to thirty-five hours of man-time is often required to clean an open mesh conveyor of an enrober system used to apply chocolate to the bottom of chewy grain bars. Obviously, this represents a significant amount of downtime for a production line.

SUMMARY OF THE INVENTION

The invention is directed to a system and method for enrobing at least bottom and partial side portions of food products by utilizing a conveyor unit employing a solid belt at a coating station. More specifically, the invention provides for a product conveying system including at least first and second, sequentially arranged conveyor belts, with at least the second conveyor belt being constituted by a solid belt. Interposed in a gap between the first and second belts is a dispenser head of a coating manifold. An upper surface of the second conveyor belt is arranged in a plane just below a plane of an upper surface of the first conveyor belt such that the dispenser head spans the gap, with an elongated outlet portion of the dispenser head being exposed, in a downstream direction of the system, to an upper surface of the second conveyor belt.

During operation, the manifold receives a liquid coating material and dispenses the coating material directly onto a predetermined percentage of the overall width of the second, solid belt while spaced food products are directed from the first belt into the coating material on the second belt. In accordance with an aspect of the invention, the coating material is thick so as to not ready flow off the belt, thereby avoiding the need for any lateral containment structure on the solid belt. With this arrangement, the coating material coats the bottom or lowermost side of the food product, as well as extending up and coating side portions of the food product to a degree dependent upon the food product being coated and the coating thickness or height applied to the solid belt. Downstream of the dispenser head, excess coating is removed from the food product to establish an even bottom coating, particularly by directing each coated food product over a detailer assembly, preferably including a rotatable comb detailer and/or a rotatable spinner bar. When used in combination, the comb detailer and spinner bar can be driven at different speeds from both each other and the second belt. After being subjected to the detailer assembly, the coated food product is removed from the solid belt and the excess coating material is scraped from the belt, collected, filtered and recycled back to the manifold.

In accordance with a particular embodiment of the invention, the coating material is thick, melted chocolate which is applied onto the solid belt with a low pressure drop (e.g., less than 0.1 psig) across the horizontal portion of the head and a higher pressure drop (e.g., preferably in the range of 2-30 psig and, more preferably, 7-12 psig) across the vertical portion of the dispenser head to provide a uniform layer thickness across the belt. The layer thickness depends on the desired coating weight and is preferably about 6-9 mm for bottom coating chewy grain bars and 2-5 mm for bottom coating of crunchy baked bars. Layer thickness is primarily varied by how much coating is applied to the belt, as well as the amount of coating removed by the detailer assembly. Upon reaching a downstream end of the second belt, the coated bars are automatically transferred onto a third conveyor belt which is also solid and constitutes a cooling or chill belt, establishing a predetermined cooling temperature and residence time. Still, the invention has applicability to a wide range of coatings and products, basically coating materials which can be heated and cooled to alter viscous characteristics thereof and food products which can be sheeted and conveyed. In any case, additional objects, features and advantages of the invention will become more readily apparent from the following detailed description when taken in conjunction with the drawings wherein like reference numerals refer to corresponding parts in the several views.

DETAILED DESCRIPTION OF INVENTION

Figure 1:
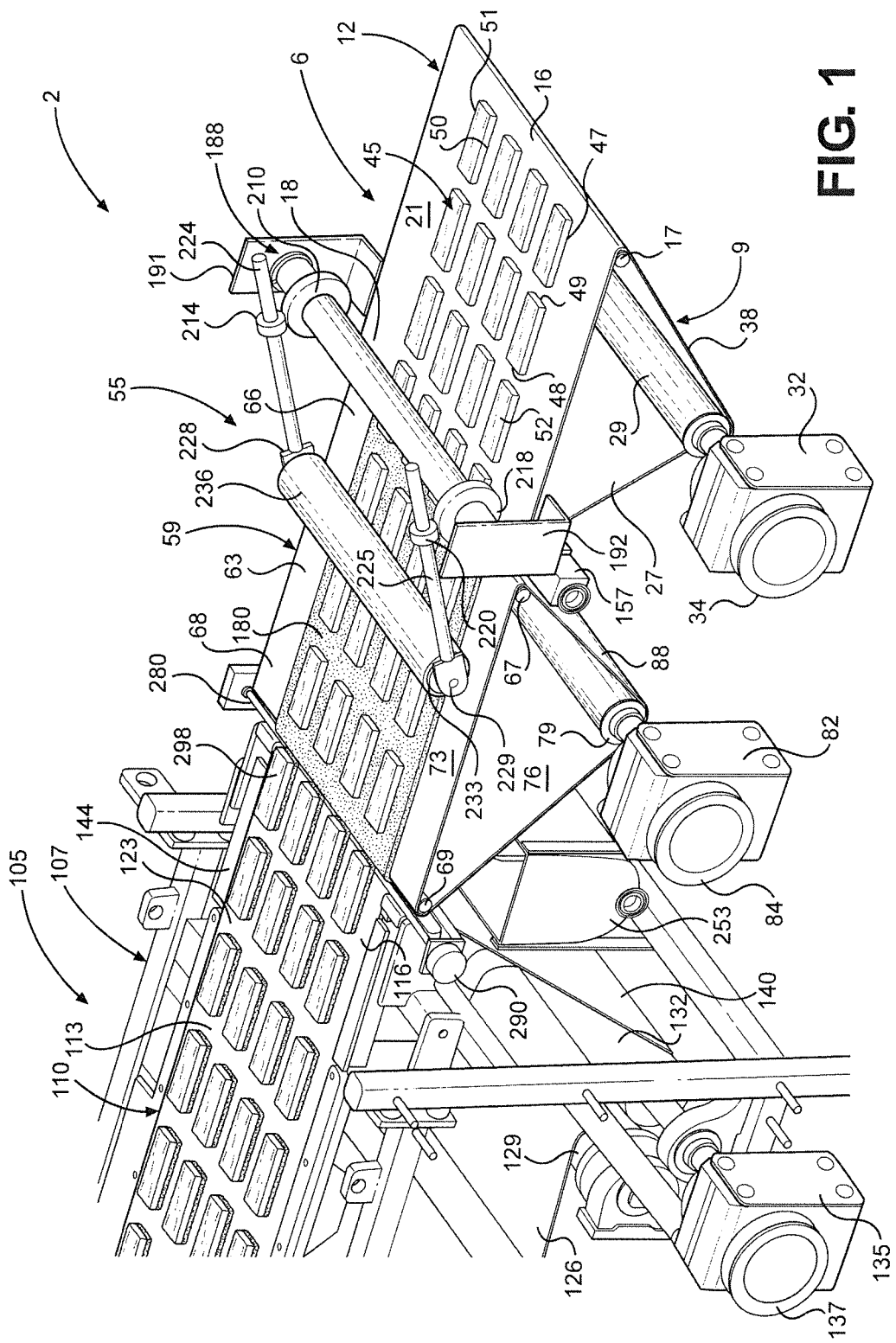
FIG. 1 is a perspective view of a food product coating and conveying system according to an embodiment of the invention.

With initial reference to FIG. 1, a coating system constructed in accordance with the present invention is generally indicated at 2. Coating system 2 incorporates a transfer station 6 including a first conveyor unit 9 employing a first conveyor belt 12 shown as an endless, solid belt. In the position illustrated, conveyor belt 12 has a first longitudinal end 16 which extends about a roller 17 and leads to a downstream, second longitudinal end 18 which is also supported by a roller (not shown). Between first and second longitudinal ends 16 and 18 is established an upper surface 21 of conveyor belt 12. Stemming from second longitudinal end 18 is a down-turned portion 27 which extends about a drive roller 29 of a drive unit 32. At this point, it should be noted that drive roller 29 can be rotatably driven in various ways to propel conveyor belt 12. For instance, drive unit 32 can itself constitute an electric, hydraulic or other motor or, as in the illustrated embodiment, drive unit 32 can include a pulley 34 which is adapted to be driven by a further drive belt/motor drive mechanism (not shown). In any case, from drive roller 29, conveyor belt 12 has an upturned portion leading back to first longitudinal end 16. At this point, it should be apparent that the drawings presented here show simplified conveyor arrangements for reference purposes only. Therefore, it should be understood that idler pulleys, tracking systems, take-up adjustment mechanisms and the like as commonly known in the art would also be employed.

As will become more fully evident below, the present invention can be used in coating bottom and partial side portions of various products. In one particular embodiment, coating system 2 is used in coat food products 45 in the form of chewy grain bars, each having a bottom surface 47, a front side surface 48, a rear side surface 49, lateral side surfaces 50 and 51, and a top surface 52. As shown, the previously prepared food products 45 have been deposited on upper surface 21 in rows and columns for transport by conveyor belt 12 from transfer station 6 to a downstream coating station 55. Coating station 55 includes a second conveyor unit 59 employing a second conveyor belt 63 having, in the position illustrated, a first longitudinal end 66 supported by a roller 67 and a second longitudinal end 68 supported by a roller 69, with conveyor belt 63 establishing an upper surface 73 between first and second longitudinal ends 66 and 68. From upper surface 73, conveyor belt 63 leads to a down-turned portion 76 extending around a drive roller 79 of a drive unit 82, which may include a pulley 84 such as for a common drive with drive unit 32, and an upturned portion 88 leading back to first longitudinal end 66.

For reasons which will be detailed more fully detailed below, it is important in accordance with the present invention that second conveyor belt 63 is constituted by a solid conveyor belt, without any associated open mesh metal wires or links. In the embodiment shown, conveyor belt 63 is formed entirely from a polymeric material, such as a polyester base provided with a polyurethane topcoat. That is, in order to not depart from the invention, conveyor belt 63 must be solid, at least across a majority of the lateral dimension or width of conveyor belt 63. However, prior to further detailing this important aspect of the invention, FIG. 1 also illustrates a cooling station 105 as part of coating system 2. As shown, cooling station 105 includes a frame 107 supporting a third conveyor unit 110. Third conveyor unit 110 includes a third conveyor belt 113 shown having a first longitudinal end 116. Conveyor belt 113 is also shown to include an upper surface 123, a return portion 126 extending about a guide roller 129 and a drive roller 132 of a drive unit 135 having a pulley 137, and an upturned portion 140 leading back to first longitudinal end 116. In order to establish a desired cooling function, cooling station 105 includes at least one chiller unit, such as indicated at 144, for cooling conveyor belt 113. In general, chiller unit 144 can take various forms, including employing conduction and/or convection cooling arrangements, with one preferred embodiment employing a chip plate cooler provided directly below conveyor belt 113.

Figure 2:
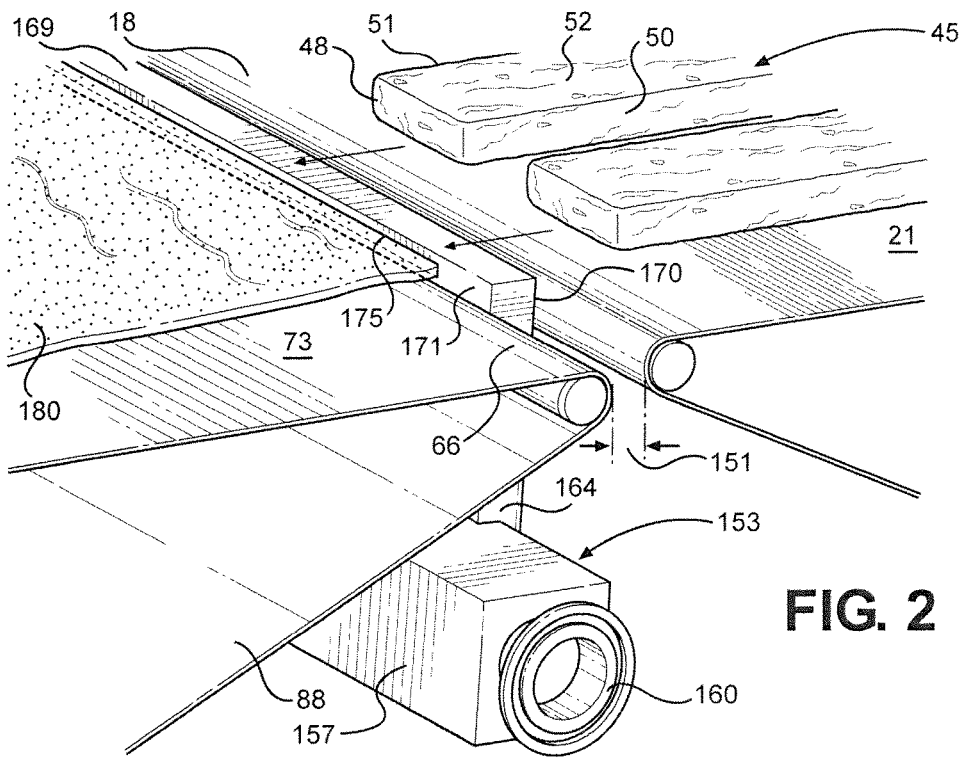
FIG. 2 is an enlarged perspective view of a portion of the system of FIG. 1.

As best shown in FIG. 2, a vertical and longitudinal gap 151 is established between second longitudinal end 18 of first conveyor belt 12 and first longitudinal end 66 of second conveyor belt 63. Interposed in gap 151 is a coating unit 153. More specifically, coating unit 153 includes a manifold 157, having an input port 160, and an upstanding dispenser head 164. As clearly illustrated, it is dispenser head 164 which projects into gap 151, with dispenser head 164 including an uppermost wall 169, an upstream side wall 170 and a downstream side wall 171. In downstream side wall 171 and effectively extending across a majority of the lateral dimension or width of second conveyor belt 63 is at least one elongated dispensing opening or outlet 175 for dispensing a coating material 180 onto upper surface 73. More specifically, upper surface 21 of first conveyor belt 12 is located in a plane above a plane established by upper surface 73 of second conveyor belt 63. Therefore, upper surface 73 is just below upper surface 21. On the other hand, uppermost wall 169 of dispenser head 164 is substantially flush with upper surface 21, while dispensing opening 175 has a lowermost edge (not separately labeled) which is substantially coplanar with upper surface 73, and an uppermost edge (also not labeled). With this arrangement, dispenser head 164 spans gap 151, with elongated outlet opening 175 of dispenser head 164 being exposed, in a downstream direction of conveyor unit 9, to upper surface 73 of second conveyor belt 63 such that coating material 180 having a predetermined thickness (height) can be directly deposited upon upper surface 73 of second conveyor belt 63 from a position between first and second conveyor belts 12 and 63.

Figure 3:
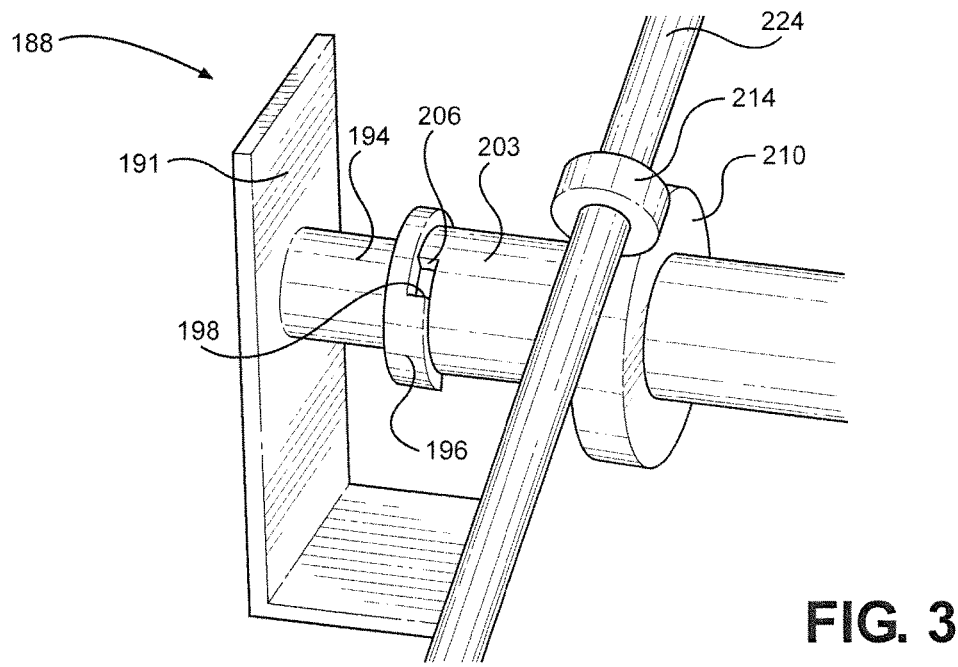
FIG. 3 is an enlarged view of a corner section of a tap-down roller unit employed in connection with an aspect of the invention.

Prior to describing the overall operation of coating system 2, further structure associated with the present invention will now be described in connection with the illustrated embodiment. Initially, as shown in FIGS. 1 and 3, coating system 2 can employ a tap-down or presser unit 188 for forcing food products 45 into coating material 180 upon second conveyor belt 63. In the embodiment shown, presser unit 188 includes a pair of side support brackets 191 and 192 which support a transverse shaft 194. Adjustably secured to shaft 194 is a lock collar 196 which defines a stop surface 198. Presser unit 188 also includes a sleeve member 203 extending about and rotatably supported by shaft 194, with sleeve member 203 defining an abutment 206 aligned with stop surface 198. In addition, at spaced locations along shaft 194, presser unit 188 includes radial flanges 210, which extend from and are fixed to sleeve member 203 for rotation relative to shaft 194, and support rings 214 fixed to radial flanges 210. Each support ring 214 adjustably receives a respective support rod 224, 225. Support rods 224 and 225 terminate in support plates 228 and 229 which rotatably support a roller 233 having an outer sheath 236. With this arrangement, sheath 236 engages the top surface 52 of each food product 45 as second conveyor belt 63 is driven, thereby forcing the food products 45 to be partially immersed in coating material 180. The engagement of abutment 206 with stop surface 198 limits the degree to which roller 233 can shift downward. Although roller 233 could be biased in this direction, it has been found that the mere weight of this structure provides sufficient force for this function. The vertical distance between roller 233 and upper surface 73 of second conveyor belt 63 can be readily adjusted by securing lock collar 196 to shaft 194 at a select location, such as with a set screw (not shown). Roller 233 can be freely, rotatably supported by support plates 228 and 229, but roller 233 can also be positively driven to rotate in unison with the movement of second conveyor belt 63, such as by employing a self-contained drive motor (not shown) within the structure of roller 233.

Figure 4:
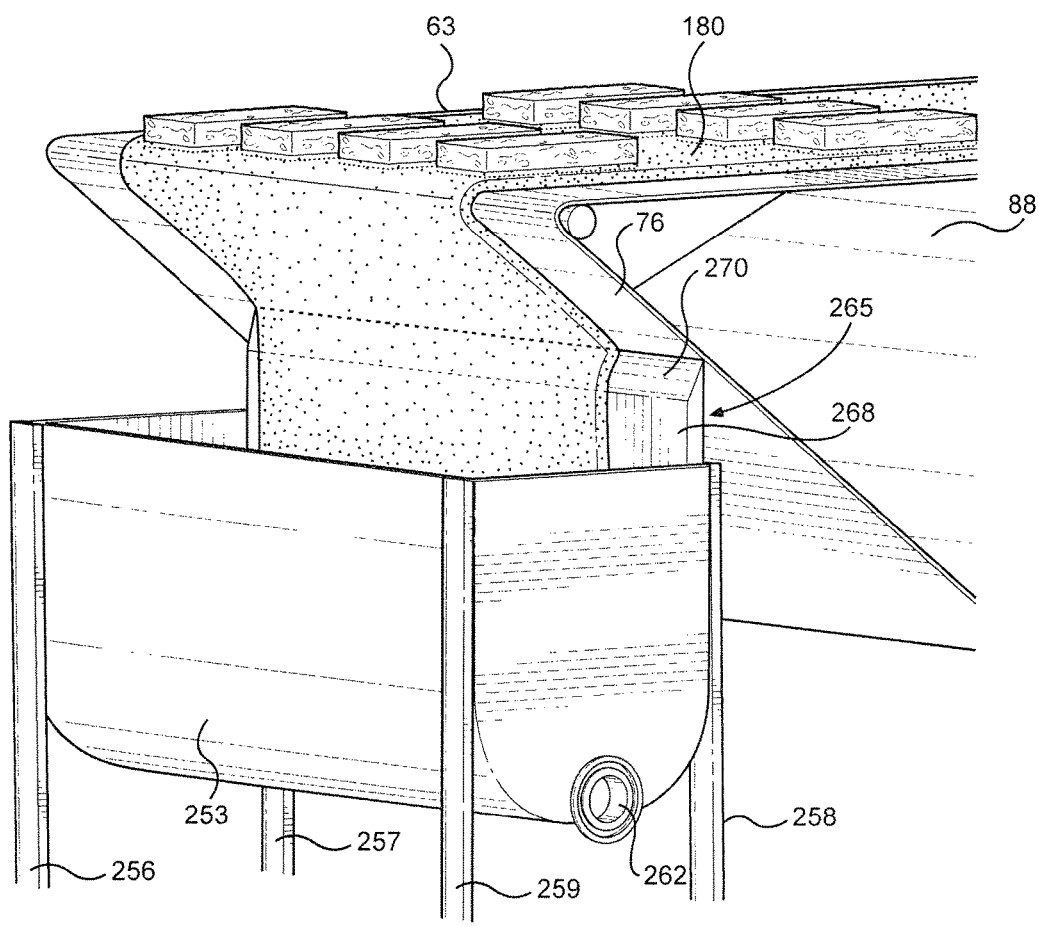
FIG. 4 is a perspective view of a terminal end of one conveyor section provided in the system of FIG. 1.

FIGS. 1 and 4 illustrate the inclusion of a hopper 253 used to hold coating material 180. More specifically, as best illustrated in FIG. 4, hopper 253 is shown to be supported by legs 256-259 (not depicted in FIG. 1 for clarity of the drawing) and includes an outlet port 262. Hopper 253 is positioned below upper surface 73 of second conveyor belt 63 and has associated therewith a scraper device 265 including a blade member 268 having an edge 270 which engages inturned portion 176 of second conveyor belt 63. With this arrangement, scraper device 265 is located at a position spaced from second longitudinal end 68 and below upper surface 73 of second conveyor belt 63. At this location, the excess coating material 180 is scraped from second conveyor belt 63 and collected in hopper 253, enabling the coating material 180 to be pumped through outlet port 262, filtered and recycled back to manifold 157 through additional pumping and filtering equipment (not shown).

Figure 5:
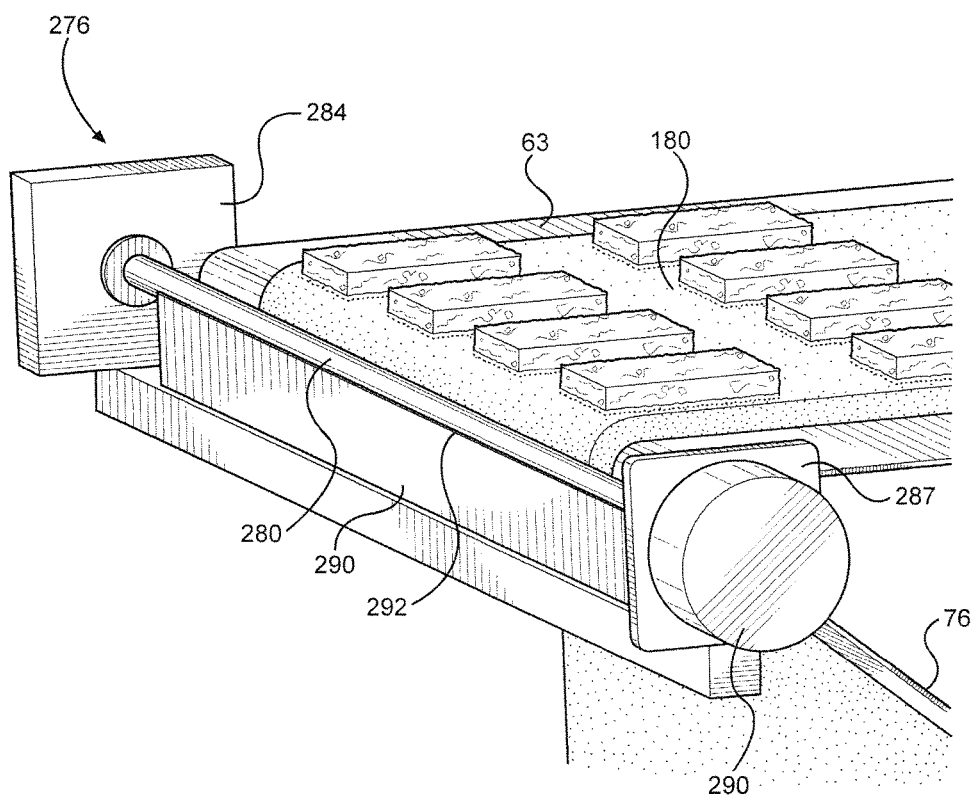
FIG. 5 is a perspective view detailing another portion of the system of FIG. 1.

FIGS. 1 and 5 will now be referenced in describing a spinner device 276 also incorporated into coating system 2 for detailing purposes. As shown, spinner device 276 includes a spinner bar 280 which is rotatably supported by a support block 284 at one end and a support plate 287 at another end. Spinner bar 280 has an associated cradle 290 having an upper end portion 292 which, although not separately depicted, is generally U-shaped in cross-section so as to conform to the contour of bar 280. A drive motor 290 is employed to rotate spinner bar 280. With this overall arrangement, the food products 45 deposited on first conveyor belt 12, which actually can be made of solid or mesh construction, are transferred above uppermost wall 169 of dispenser head 164 onto coating material 180 already deposited upon upper surface 73 of second, solid conveyor belt 63. Although coating material 180 and the thickness (height) thereof can vary in accordance with the invention, one embodiment employs about a 8-9 mm layer of thick chocolate having a molasses-like consistency being delivered through an approximately 7.5 cm delivery pipe (not shown) connected to inlet port 160 of manifold 157 at a temperature in the range of 35-46° C. (about 95-115° F.). Importantly, the solid construction of conveyor belt 73 is such that coating material 180 will not flow through upper surface 73. At the same time, coating material 180 is thick, i.e., has a high viscosity, such that coating material 180 must be pumped for dispensing and will not flow laterally off of upper surface 73. For dispensing the coating material 180, upstanding dispenser head 164 is designed such that there is a very low pressure drop across the width, but rather the majority of the pressure drop occurs over the height.

In accordance with a particular embodiment of the invention, the coating material is thick, melted chocolate which is applied onto the solid belt with a low pressure drop (e.g., less than 0.1 psig) across the horizontal portion (not separately labeled) of dispenser head 164 and a higher pressure drop (e.g., preferably in the range of 2-30 psig and, more preferably, 7-12 psig) across the vertical portion (not separately labeled) of dispenser head 164. This assures an even flow, with food products 45 becoming partially immersed in coating material 180 such that coating material 180 will become enrobed on at least bottom surface 47 and portions of front, rear and side surfaces 48-51. The layer thickness depends on the desired coating weight and is preferably 6-9 mm for bottom coating chewy grain bars and 2-5 mm for bottom coating of crunchy baked bars. At the same time, presser unit 188 can further assure that an appropriate tap-down force is applied on food products 45 for proper coating. Once reaching second longitudinal end 68, the coated food products 298 are transferred onto third conveyor belt 113 of cooling station 105, while excess coating material 180 is delivered into hopper 253 in conjunction with scraper device 265. Any tailing of the coating material 180 associated with the transfer to cooling station 105 is avoided by the presence of spinner device 276. More specifically, spinner bar 280 is rotatably driven by motor 290 at a rotational speed greater than the drive for conveyor belt 63 and functions to remove tailings from the coated food products 298. This coating material is then scraped from bar 280 based on the conformity between cradle 290 and bar 280.

Figure 6:
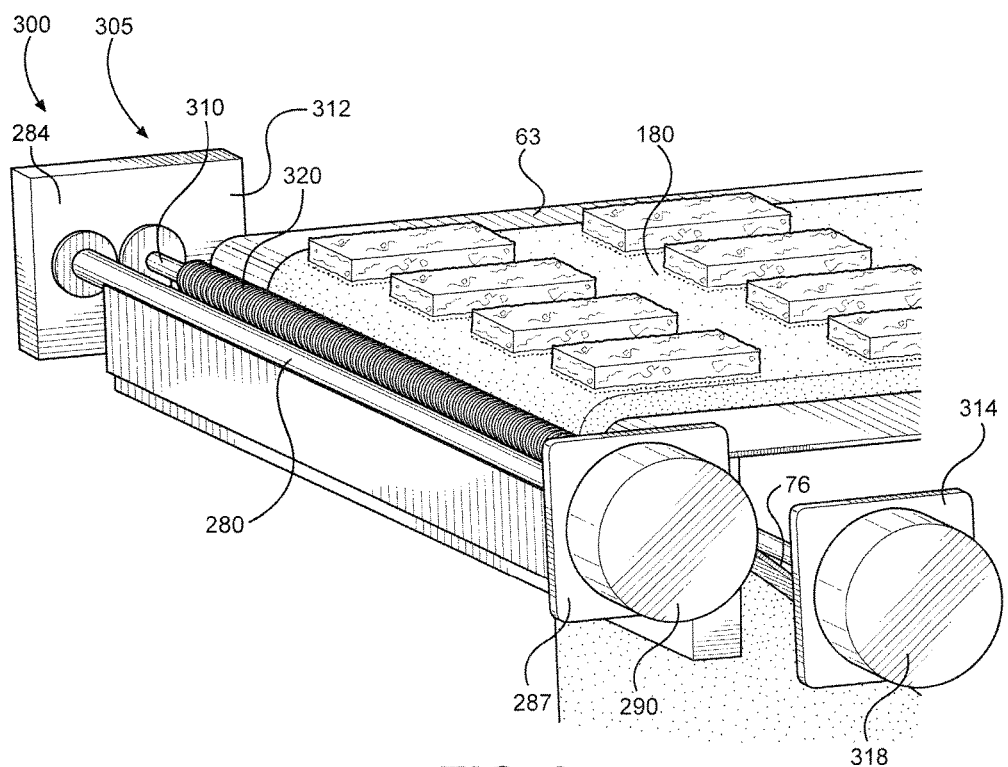
FIG. 6 illustrates the inclusion of a comb detailer to the arrangement of FIGS. 1-5.

Mainly due to slight deflections across the length of bar 280, in practice, the inclusion of spinner device 276 alone can result in bottom thickness variations between the various coated food products 298. Therefore, as shown in connection with the modified arrangement of FIGS. 6 and 7, spinner device 276 actually forms part of an overall detailer assembly 300 which is provided directly adjacent second longitudinal end 68 of conveyor belt 63 and also includes a comb detailer generally indicated at 305. Comb detailer 305 includes a rod 310 rotatably supported between spinner bar 280 and conveyor 63. More specifically, rod 310 is rotatably supported at one end by an extension 312 of block 284 and by a support plate 314 at another end. A motor 318 is provided to rotate rod 310, along with a series of comb elements 320 which are co-rotatably mounted to rod 310 at axially spaced locations. As discussed further below, comb elements 320, as well as rod 310, have an associated cradle 325 (see FIG. 7).

Figure 7:
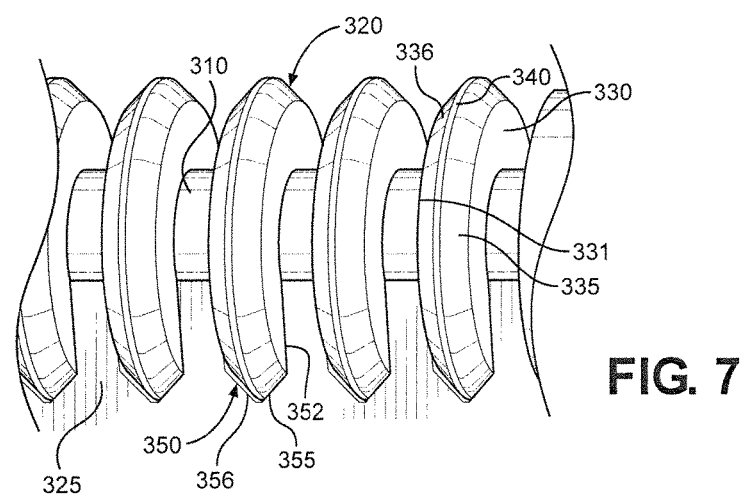
FIG. 7 is an enlarged view of a portion of the comb detailer of FIG. 6.

As best shown in FIG. 7, each comb element 320 generally takes the form of a disc including opposing side wall portions 330 and 331 which extend radially from rod 310 and lead to respective angled or tapered portions 335 and 336, as well as a central, rounded connecting portion 340. Cradle 325 generally takes the form of a comb, including teeth portions (not separately labeled) defined between cutouts 350 defined by adjacent upright walls, one of which is indicated at 352 leading to base cut-out portions defined by sloped walls 355 and 356. As shown, walls 352 are spaced only slightly greater than the distance between side wall portions 330 and 331 of a respective comb element 320, while sloped walls 355 and 356 are generally V-shaped so as to conform to angled portions 335 and 335 respectively.

With this arrangement, coated food products 298 are first directed over comb detailer 305 whereupon comb elements 320 not only drive the coated food products 298 downstream (note there are multiple, such as 3-6, comb elements 320 supporting each transferred food product 298) but also remove excess coating material 180 from the bottom surfaces 47 of the coated food products 298, thereby assuring a more even bottom coating for the products across the entire width of conveyor belt 63. Thereafter, any remaining tailings are removed as the coated food products 298 proceed across spinner device 276 as described above. In accordance with the invention, the speeds at which conveyor belt 63, rod 310 of comb detailer 305 and bar 280 of spinner device 276 are driven can vary. For instance, rod 310 can be driven such that coated food products 298 move at the same speed across comb elements 320. However, in accordance with a more preferred form of the invention, rod 310 and, correspondingly, comb elements 320 are driven faster than conveyor belt 63 and coated food products 298, generally in the order of 30% faster but even up to twice the speed. This causes comb elements 320 to actually slip relative to bottom surfaces 47 wherein, as the relative speed increases, more coating is pulled off the bottom surfaces. In addition, spinner bar 280 can be driven even faster than rod 310. In any case, each of the comb elements 320 and the spinner bar 280 is preferably rotated by a drive arrangement at a speed faster than a rate in which the second conveyor belt 63 is driven.

The length of first conveyor unit 9 will depend on the overall manufacturing configuration. On the other hand, the length of second conveyor unit 59 can actually be quite short, such as less than 2 meters, along with a preferably commensurate width. The length of third conveyor unit 110 will depend on the time need to cool and further solidify coating material 180. In the case of chocolate, a rather long cooling period is typically needed, such as about a 3 minute residence time. With this in mind, this length can be from 12-25 meters, but can be advantageously reduced to about 3 meters utilizing certain conveyor material and a flat, aluminum plate cooling system. To this end, a thin, high heat transfer material, such as TEFLON, having a thickness in the order of about 0.025 cm ($^{10}/_{1000}$ of an inch) can be advantageously employed as the conveyor material such that this overall chilling arrangement can reduce the cooling time to approximately 40 seconds.

Although described with reference to exemplary embodiments of the invention, it should be readily understood that various changes and/or modifications can be made to the invention without departing from the spirit thereof. For instance, other than applying chocolate, various other coating materials which can be heated and cooled could be employed, including yogurt, marshmallow, fruit and cheese. In addition, other food products which can be sheeted and conveyed could be coated, including candy, dough, cereal, cookies and ice cream. Furthermore, it should be noted that the spinner device and comb detailer can be used separately or in combination. Most importantly, it has been found that completely avoiding mesh metal conveyor materials but rather utilizing the solid and small length (less surface area) conveyor belt as discussed above for the coating operation enables the cleaning time to be significantly reduced, basically from about thirty-five hours to about four hours, thereby representing a major efficiency enhancement.

We claim:

1. A method of coating bottom and partial side portions of a food product comprising:

directing the food product in a longitudinal direction along a first conveyor belt which is spaced from a second, solid conveyor belt by a gap;

dispensing a coating material onto and laterally across a portion of the second, solid conveyor belt from within the gap;

transferring the food product from upon the first conveyor belt onto the second, solid conveyor belt wherein the food product becomes partially immersed in the coating material to establish a coated food product;

evening out the coating material on the bottom portion of the food product by directing the bottom portion of the food product across a detailer assembly; and removing the coated food product from the second, solid conveyor belt, wherein directing the food product across the detailer assembly includes causing the food product to be delivered across a plurality of spaced, rotatable comb elements which remove excess coating material to assure a more even coating on the bottom portion of the food product.

2. The method of claim 1, wherein the gap constitutes a longitudinal gap and the coating material is dispensed from at least one side wall opening provided in a dispenser head projecting vertically into the longitudinal gap.

3. The method of claim 2, further comprising: pumping the coating material to the dispenser head through a manifold.

4. The method of claim 3, further comprising: collecting excess coating material from the second, solid conveyor belt and recycling the excess coating material to the manifold.

5. The method of claim 4, wherein collecting the excess coating material includes scraping the excess coating material from the second, solid conveyor belt.

6. The method of claim 4, wherein the second, solid conveyor belt includes a first longitudinal end juxtapose the gap and a second longitudinal end, wherein said detailer assembly is provided directly adjacent the second longitudinal end for removing the excess coating material from the food product.

7. The method of claim 1, wherein directing the food product across the detailer assembly further includes causing the food product to be delivered over a spinner rod which is separate and distinct from the plurality of spaced, rotatable comb elements.

8. The method of claim 7, further comprising: rotating each of the comb elements and the spinner bar at a speed faster than a rate in which the second, solid conveyor belt is driven.

9. The method of claim 1, further comprising: forcibly pressing the food product into the coating material upon the second, solid conveyor belt.

10. The method of claim 1, wherein delivering the coating material across a portion of the second, solid conveyor belt constitutes delivering the coating material across a majority of the second, solid conveyor belt.

11. The method of claim 10, wherein the coating material is thick such that, upon dispensing the coating material onto and laterally across the majority of the second, solid conveyor belt, the coating material does not flow laterally off the second, solid conveyor belt.

12. The method of claim 1, wherein removing the coated food product from the second, solid conveyor belt includes transferring the coated food product to a third conveyor belt which is longitudinally aligned with the second, solid conveyor belt, said method further comprising chilling the coated food product on the third conveyor belt.

13. The method of claim 1, wherein the food product constitutes a chewy grain bar and the coating material constitutes chocolate.

14. A method of coating bottom and partial side portions of a food product comprising:
   delivering a food product along a first conveyor belt which is spaced from a second, solid conveyor belt by a gap;
   dispensing a coating material onto and laterally across the second, solid conveyor belt from within the gap;
   transferring the food product from the first conveyor belt to the second, solid conveyor belt, with the bottom and partial side portions of the food product becoming partially immersed in the coating material in order to establish a coated food product; and
   directing the coated food product over a detailer assembly including a comb detailer having a plurality of spaced, rotatable comb elements to even out the coating material on the bottom portion of the coated food product.

15. The method of claim 14, wherein coating material is dispensed from a dispenser head located within the gap, with the dispenser head includes an uppermost wall, an upstream side wall, a downstream side wall and at least one dispensing opening provided in the downstream side wall from which the coating material is dispensed.

16. The method of claim 14, further comprising: rotating each of the plurality of spaced, rotatable comb elements while directing the coated food product over the detailer assembly.

17. The method of claim 16, wherein directing the coated food product over the detailer assembly further includes directing the coated food product over a rotatable spinner bar.

18. The method of claim 17, further comprising: driving each of the comb elements and the spinner bar for rotation at a speed faster than a rate in which the second, solid conveyor belt is driven.

19. The method of claim 14, further comprising: forcibly pressing the food product into the coating material upon the second, solid conveyor belt.

* * * * *